April 14, 1970  C. A. BYERS  3,505,859

ULTRASONIC TESTING APPARATUS

Filed Feb. 27, 1967  2 Sheets-Sheet 1

INVENTOR.
CLIFTON A. BYERS
BY
Oldham & Oldham
ATTORNEYS

INVENTOR.
CLIFTON A. BYERS

United States Patent Office 3,505,859
Patented Apr. 14, 1970

3,505,859
ULTRASONIC TESTING APPARATUS
Clifton A. Byers, Cuyahoga Falls, Ohio, assignor to The Goodyear Tire & Rubber Company, Akron, Ohio, a corporation of Ohio
Filed Feb. 27, 1967, Ser. No. 618,608
Int. Cl. G01n 29/04
U.S. Cl. 73—67.5                                7 Claims

ABSTRACT OF THE DISCLOSURE

The invention relates to an ultrasonic test apparatus where the article to be tested is immersed into a liquid and a through transmission of ultrasonic sound is utilized where the transmission covers substantially the entire area of the article to be tested and a total integration of the total signal achieved by the scanning is utilized to determine where the article falls with respect to a predetermined minimum standard. This determines whether the article as a whole meets minimum requirements. Collimators are utilized with the ultrasonic transducers which include a sound absorbing material to insure good sound transmission only along the axes thereof.

---

Therefore, it is the general object of the present invention to provide a system for substantially automatically testing brake discs or other metal objects with an ultrasonic beam transmitted through the disc to determine the quality of the disc.

The mechanism utilized can achieve these results on brake discs of greatly varying diameter, thickness, and material composition. It is designed to operate semiautomatically with high reliability, and great speed so that only the highest quality of brake discs are actually put into commercial use.

DESCRIPTION OF THE DRAWINGS

For a better understanding of the invention reference should be had to the accompanying drawings wherein.

MECHANICAL SYSTEM

Figure 1:
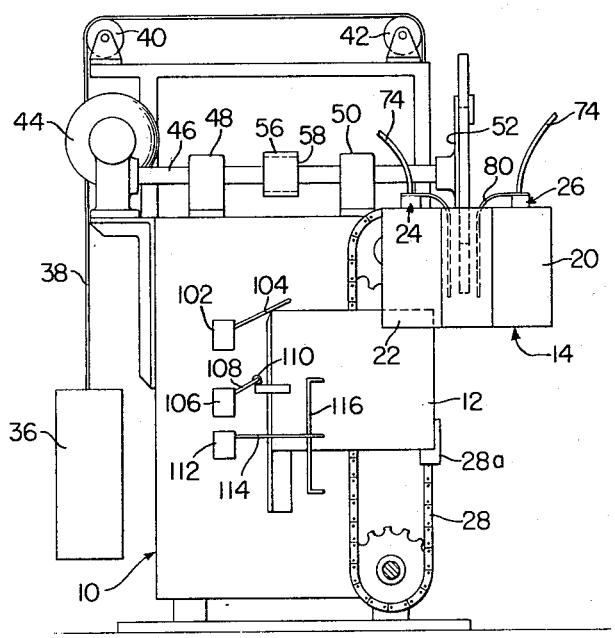
FIGURE 1 is a side elevational view of the test mechanism designed to achieve the objects of the invention.
Figure 2:
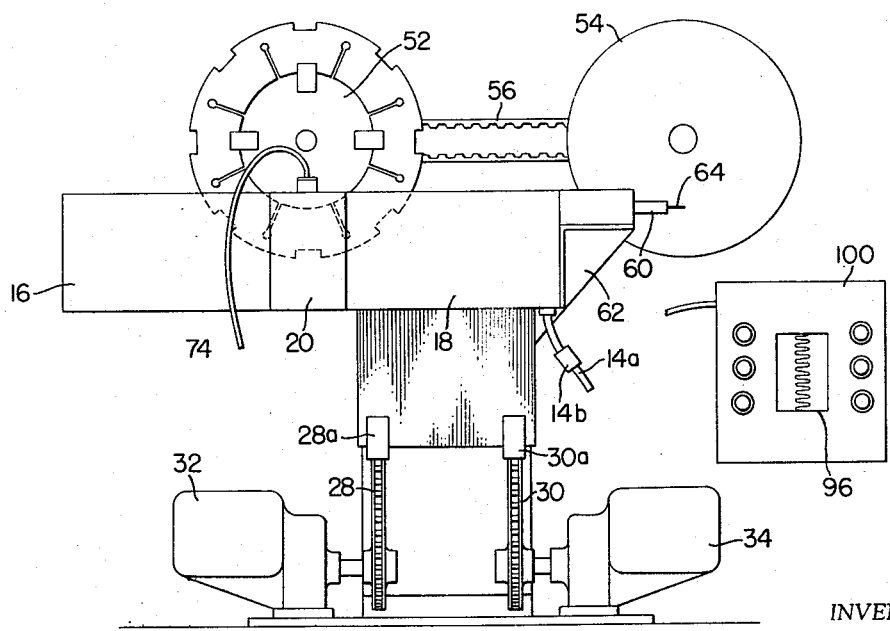
FIGURE 2 is a front elevational view of the mechanism of FIGURE 1.

With respect to FIGURE 1 and 2 of the drawings, the numeral 10 indicates generally a base frame which mounts a vertical slide 12. The slide 12 operatively positions thereon for vertical sliding motion a testing pan or tank, indicated generally by numeral 14. The tank 14 is deep enough to correspond substantially to the radius of any brake disc to be tested. It has longitudinally extending sections 16 and 18, respectively, as best seen in FIGURE 2 which receive the brake disc to be tested, and side extensions 20 and 22, respectively, which mount and receive the ultrasonic transducer units which act as transmitter and receiver and indicated generally by numerals 24 and 26, respectively.

The slide 12 is moved in a vertical direction with respect to the frame or stand 10 by a pair of roller chains 28 and 30, each driven by a motor-clutch combination identified by numerals 32 and 34, respectively. In practice, the invention contemplates that one of the motor-chain combinations will move the slide 12 in the upward direction at a predetermined speed while the other motor-chain combination will return the slide to its initial position at perhaps a different speed. For example, the actual ultrasonic test is normally conducted on the upward movement of the slide as the brake disc to be tested is immersed into the pan 14, and this rate of rise might be about 4 inches per minute. Whereas, it is desirable to rapidly reposition the pan 14 to facilitate removal of the disc tested and positioning of another disc to be tested, and this repositioning speed might be at a rate of about 66 inches per minute.

In order to counterbalance the weight of the pan 14 full of liquid for the ultrasonic test, and not impose too great a drive requirement on the motor-clutch sets 32 and 34, respectively, the invention contemplates that a counterbalancing weight 36 might be positioned to act through a cord 38 over rollers 40 and 42 to thereby connect to the top of pan 14, thus providing the desired counterbalance necessary. Naturally, the amount of the weight 36 can be varied in accordance with the amount of liquid carried in pan 14.

In order to facilitate the complete ultrasonic testing of the entire brake disc, the invention contemplates rotation of the brake disc as it is immersed into a fluid carried in pan 14 upon the raising thereof. To this end, a motor 44 rotatably drives a shaft 46 which is carried in bearings 48 and 50. The shaft 46 is directly connected to a disc receiving plate 52 whereby the plate 52 is rotatably driven upon actuation of motor 44. The invention contemplates that any suitable rotative driving speed to achieve a complete ultrasonic test will meet the objects of the invention. It has been found that a rotative speed between 12 and 36 r.p.m. will function properly with the vertical raising speed of pan 14 being between about 2 to about 6 inches per minute for brake discs of a thickness between about ¼ inch to about 1 inch.

In order to record the ultrasonic information determined by immersing the disc in a rotative manner into pan 14, the invention contemplates that a recorder plate 54 is mounted in fixed relation to frame 10, and at a space distance from the disc holding plate 52. The recorder plate 54 is rotatably mounted and is driven at exactly the same rotative speed as plate 52 through a suitable belt 56 connected onto a drive gear 58 carried by shaft 46, as best seen in FIGURE 1. Thus, the recording plate 54 rotates at the same speed as the disc carrying plate 52. It is preferable but not necessary that plate 54 have a radius equal to the radius of the largest disc to be tested. Then, to achieve the recording, a stylus 60 driven by the ultrasonic signal received at transducer receiver 26 is mounted in fixed relationship to the pan 14 by a suitable bracket 62. Therefore, it should be understood that upon the raising of pan 14, a needle 64 carried by stylus 60 engages an electrosensitive paper carried on the surface of the recorder plate 54 so that the brake disc material quality in a path determined by the spiral scan of the ultrasonic head over the brake disc is duplicated on the recording paper carried by the recording plate. If it is desired to test the brake disc of greater diameter than the recorder plate 54, it is necessary to adjust the position of the needle or pin 64 so that it will trace on the limited diameter of plate 54.

The actual tensions of chains 28 and 30 can be adjusted by adjustment blocks 28A and 30A located at the point where the chains are attached to the bottom of the slide 12. Also, the fluid carried in pan 14 may be drained through a drain line 14A controlled with a valve 14B, as best seen in FIGURE 2. The invention contemplates that any suitable liquid may be utilized, such as water, a light oil, or a nonrusting liquid, for examples.

Figure 3:
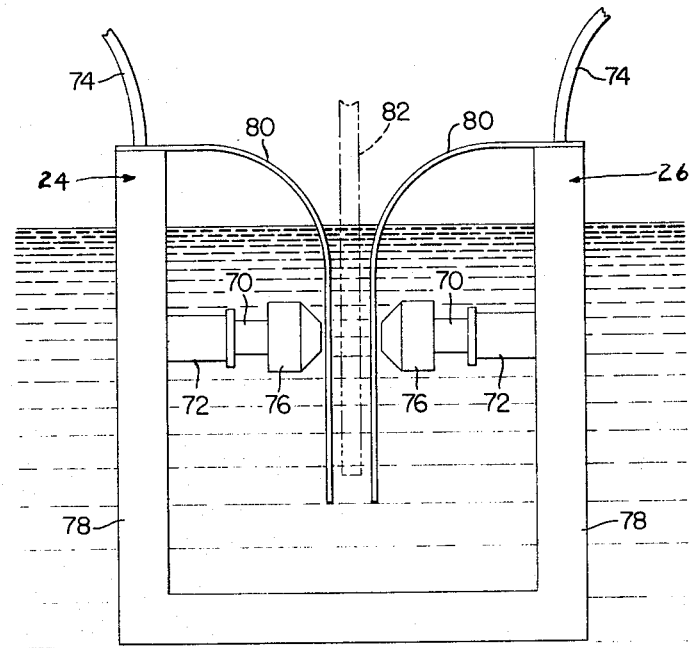
FIGURE 3 is an enlarged cross sectional elevation of the testing tank illustrating the relationship of the transducer heads, the guards, and the disc to be tested.

The invention contemplates that any suitable ultrasonic system which includes an ultrasonic generator and receiver will meet the objects of the invention. For example, a Branson Sonoray Model 301 ultrasonic generator operating either from batteries or a direct A-C input signal could be utilized. The frequency of the ultrasonic operation is controlled by the transducers, each indicated by numeral 70 as seen in FIGURE 3 of the drawings. The invention contemplates that the frequency of the transducers can be changed as desired. In the example described, transducers operating at 2.25 megacycles and 5.0 megacycles are suitable. This gives the operator of the equipment a choice of frequency to utilize depending upon the characteristics of the friction mix in or on the brake disc to be tested. The greatest sensitivity to the conditions in the disc may be obtained by using the highest frequency which will penetrate a disc made from a material of good quality. For example, the 2.25 megacycle signal appears to be suitable for iron friction mixes, whereas, 5.0 megacycles may be more suitable for bronze friction mixes. The system operates on a "through-transmission" principle which means that one transducer is a transmitter of ultrasonic pulses and the other is a receiver of the pulses which find their way through the test specimen. It is important that both transducers be matched in frequency, in other words, both at 2.25 megacycles or 5.0 megacycles. The system may also be operated as pulse echo by having the sending and receiving transducers in the same head.

As best seen in FIGURE 3, the units 24 and 26 comprise the transducers 70 which are threadably mounted to supporting posts 72, each of which posts are connected through appropriate tubing 74 to the ultrasonic generator or receiving equipment, respectively. Each of the transducers 70 functions more effectively when acting through a suitable collimator, these being indicated by the conical shaped caps 74 mounted on the ends of the respective transducers 70. The purpose of the collimators 74 is to limit the diameter of the ultrasonic beam so that the region being investigated may be definitely identified. The collimators specifically used on this system for testing brake friction materials are hollow conical sections of a suitable plastic coated with a suitable sound absorbing material internally thereof to absorb any position of the ultrasonic beam which extends outside the predetermined axis of the collimators 74. The sound extending outside the ultrasonic beam must be absorbed for at least two reasons: (1) energy reverberating within the collimators would produce ambiguity and (2) energy passing through the plastic housing of the collimators would travel at a faster rate than that passing through the liquid carried in the pan, and this would also produce ambiguous results. However, it should be understood that collimators are not absolutely necessary to the success of operation.

Each of the transducer collimator combinations is provided with an immersion yoke 78 designed to support the transducers in proper relation to the test disc while the transducers are located beneath the surface of the liquid. The immersion yokes will normally suitably interlock in the bottom of pan 14, and are easily removed so that cleaning of the collimators and transducers or changing thereof to a different frequency may be readily accomplished. Two stainless steel guides 80 are mounted to the top of the immersion yokes and curve down to fit over the end of the collimators to protect the transducers and collimators from possible damage due to materials or parts accidently dropping against or brought into contact with them. The actual positioning of the brake disc to be tested between the steel guides 80 is illustrated by the dotted line 82 in FIGURE 3.

Figure 4:
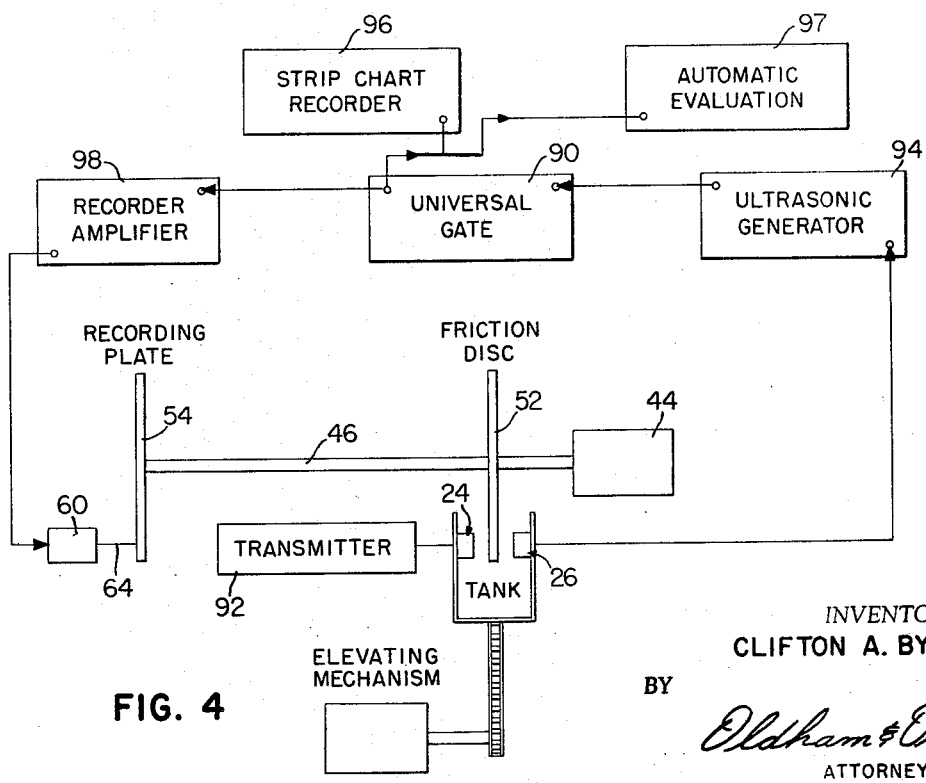
FIGURE 4 is a schemaic block diagram of the electrical components associated with the mechanical structure of the test mechanism.

In the embodiment of the invention illustrated, FIGURE 4 shows a block diagram of the electrical ultrasonic system. Herein, a Branson Sonoray Universal Gate 90 provides a means of recording the ultrasonic signals. In effect, the ultrasonic signal is provided from a transmitter 92 and sent to the transmitting transducer unit 24. The signal picked up by the receiving transducer unit 26 is passed to an ultrasonic generator 94 where the universal gate 90 then removes the signal at a preselected frequency from any position within the sweep. The selected signal from gate 90 is sent to a strip chart recorder 96, if desired, which is also indicated in FIGURE 2 of the drawings. The selected signal is also sent on to a recorder amplifier 98, and hence from there drives the stylus 60 to control the movement of the needle or pin on the sensitive paper carried by the recording plate. Note again how both the friction disc and recording plate are driven at the same rotative speed by a motor acting through a common shaft 46. For a working unit, however, it will be desirable to indicate only "accept" or "reject" of the disc tested, rather than providing an indication of the specific location of the structural defect as achieved by the recorder 96 and the recording plate. Hence, to this end, the invention contemplates the incorporation of an automatic digital display evaluation unit 97. This unit normally will utilize appropriate circuitry to integrate the total response of the readout to determine if it falls above or below a preselected minimum. A numeral indication of the total response is always given, and when this response falls below the preselected minimum, a warning such as a bell or light will be energized indicating reject. Typical apparatus for the unit 97 is made by The Servo-Systems Company of Belleville, N.J., who manufacture motors, counters, clutches, etc., for such purposes.

In order to provide some automatic control to the system, a plurality of stop or limit switches are provided. For example, a limit switch 102 as best seen in FIGURE 1 operates through its arm 104 to stop the raising of pan 14 when the top rear edge of the slide 12 engages the arm 104. A second sliding type limit switch 106 acts through its arm 108 and roller 110 to indicate that the pan 20 is in position for a scan on a brake disc because of the particular position of slide 12 so that when the equipment is actuated, the ultrasonic system will be actuated, and the stylus recording apparatus and needle will position the needle in contact with the surface of the recording plate. At the bottom of the retraction of slide 12, a third limit switch 112 acting through arm 114 engages the edge of an arm 116 connected to slide 12 to stop the reversing or retracting action of slide 12. Naturally, it should be understood that any combination of limit switches can be utilized in the equipment as selectively as desired to achieve the movement of the tank and the rotation of the brake disc to be tested. For example, the position of the tank at which the limit switches function may be preset to desired positions. Each of the motor clutches 32 and 34 may be provided with automatic emergency brakes which release electrically whenever motion stops or power failure occurs.

The reproduction of the spiral scan of the brake disc under test is normally produced on a piece of electrosensitive paper mounted on the recorder plate which rotates in synchronism with the brake disc. The electrical signals from the ultrasonic unit are passed through the amplifier 98 and then applied to a metal stylus or needle in contact with the electrosensitive paper thereby producing the visible recorded signal. A typical electrosensitive paper for this purpose might be Type A-2 Alfax paper, manufactured by the Alden Electronic and Impulse Recording Equipment Company, Inc., of Westboro, Mass.

The strip chart recorder 96 might be a Brush Model Mark II, a product of Brush Instruments Division of Clevite Corporation. The input of this instrument is an electrical signal proportional to the implitude of the ultrasonic signal transmitted through the brake disc under test. The electrical input of this instrument is obtained from the ultrasonic unit, and is in parallel with the input to the writing amplifier. A timing mark might be provided on the strip recorder once for each revolution of the test specimen. This timing mark is obtained from a switch operated from a cam on the shaft holding the test specimen.

The invention contemplates that any suitable liquid might be utilized in pan 14, although preferably it should be a liquid which will not cause rusting of the brake discs after they have been removed therefrom.

While in accordance with the patent statutes only one best known embodiment of the invention has been illustrated and described in detail, it is to be understood that the invention is not limited thereto or thereby, but that the inventive scope is defined in the appended claims.

What is claimed is:

1. An ultrasonic test apparatus which comprises a tank, a liquid in the tank, an ultrasonic generator, a pair of transducer means in the tank on opposite sides thereof in aligned relationship normally covered by the liquid in the tank, and means to transmit an ultrasonic signal from the generator into one transducer which is received by the second transducer, an article to be tested for structural defects or variations, means to rotate the article, means to provide a relative movement between the tank and the article to achieve a controlled immersion thereof into the liquid whereby the transmission of the ultrasonic signal into said first transducer passes through at least a portion of said article to be tested before being received by said second transducer, hollow conically shaped collimators each having an axis mounted to each transducer, a sound absorbing material coating the collimators to insure good sound transmission only on the axis thereof to insure that the ultrasonic signal is a perfectly directed ultrasonic beam from one transducer through the article to be tested and received by the other transducer, means to effect a scan of the total area of the article to be tested by the relative movement between the tank and the article, and means to analyze the total signal detected by the second transducer to integrate the ultrasonic signal received by the second transducer over the period of immersion to give a signal level which is measured against a predetermined standard to automatically indicate good or bad quality of the article.

2. An ultrasonic test apparatus according to claim 1 wherein the article to be tested is a circular planar brake disc, a recording surface rotatably driven in synchronism with the brake disc, and whereby the relative movement between the tank and rotation of the brake disc creates a spiral scan of the ultrasconic signal over the surface of the brake disc, and a recording stylus, engaging the recording surface, coupled directly to the tank and driven by the ultrasonic signal received by the second transducer to provide a permanent record of the structure of the article.

3. An ultrasonic test apparatus according to claim 2 wherein limit switches are included to limit the relative movement between the tank and the article to be tested, and actuate the recording stylus whenever the ultrasonic generator is actuated.

4. An ultrasonic test apparatus according to claim 3 which includes a strip recorder also driven by the ultrasonic signal received by the second transducer.

5. An ultrasonic test apparatus according to claim 1 which includes means to control the frequency of the ultrasonic beam dependent upon the structural makeup of the article to be tested, and where the transducer means are match in frequency to the frequency selected to effect drive of the first transducer.

6. An ultrasonic test apparatus which comprises a tank, liquid means in the tank, an ultrasonic generator, transducer means on both sides of the tank, and means to send an ultrasonic beam generated by the ultrasonic generator into the transducer on one side of the tank for detection by the transducer on the other side of the tank, a planar article to be tested for structural variations, means to rotate the article about an axis perpendicular to its planar surface, means to provide a relative movement between the tank and the article in a direction substantially parallel to the planar surface of the article to provide a controlled immersion thereof into the liquid while the article is being rotated so the article comes between the transducers, means to analyze the ultrasonic signal received by the other transducer by a total integration over the full period of the controlled immersion against a predetermined standard, and an automatic digital display evaluation unit to achieve the total integration and determine if it falls above or below a preselected minimum.

7. An ultrasonic test apparatus according to claim 6 which includes means to control the frequency of the ultrasonic generator dependent upon the composition of the article being tested, and a collimator associated with each transducer and having an axis, a sound absorbing material coating the collimators to insure good transmission only on the axis thereof.

References Cited

UNITED STATES PATENTS

| 3,148,535 | 9/1964 | Lemelson | 73—67.5 |
|---|---|---|---|
| 3,266,300 | 8/1966 | Graboski | 73—67.8 XR |
| 3,336,794 | 8/1967 | Wysoczanski et al. | 73—67.5 |

FOREIGN PATENTS 946,590   1/1964   Great Britain.

JAMES J. GILL, Primary Examiner

PO-1050
(5/69)

UNITED STATES PATENT OFFICE
CERTIFICATE OF CORRECTION

Patent No. 3,505,859      Dated April 14, 1970

Inventor(s) Clifton A Byers

It is certified that error appears in the above-identified patent and that said Letters Patent are hereby corrected as shown below:

Column 3, line 36, delete "74" and insert --76--;

line 37, delete "74" and insert --76--;

line 44, delete "74" and insert --76--.

Column 4, line 67, delete "implitude" and insert --amplitude--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents